J. ANDREWS.
Grain-Drill.
No. 24,980. Patented Aug. 9, 1859
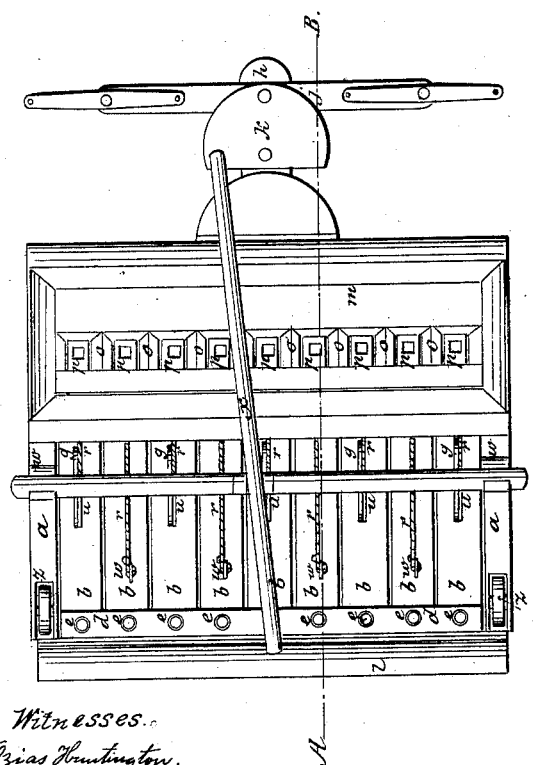
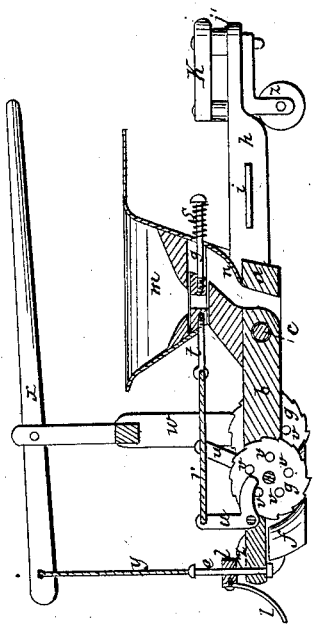
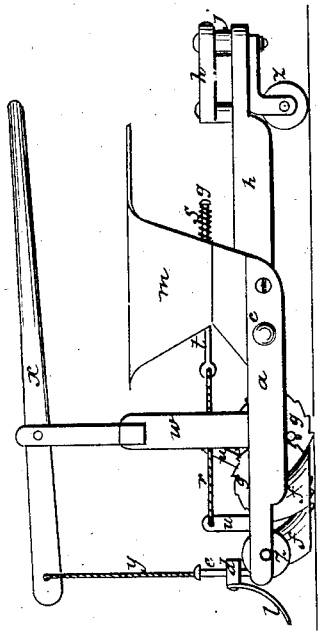
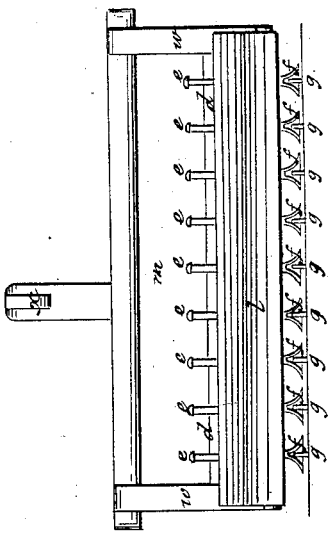
Witnesses:
Ozias Huntington.
J. B. Wheeler.
Inventor:
John Andrews.

UNITED STATES PATENT OFFICE.

JOHN ANDREWS, OF CLINTON, MASSACHUSETTS.

IMPROVEMENT IN SEEDING-MACHINES.

Specification forming part of Letters Patent No. 24,980, dated August 9, 1859.

*To all whom it may concern:*

Be it known that I, JOHN ANDREWS, of Clinton, in the county of Worcester and State of Massachusetts, have invented new and useful Improvements in a Combined Harrow and Grain-Sower; and I do hereby declare that the following is a full, clear, and exact description thereof, reference being had to the accompanying drawings, making a part of this specification, in which—

Figure 1 represents a plan of my improved combined harrow and grain-sower; Fig. 2, a side elevation of the same, and Fig. 3 a longitudinal vertical section taken on the red line A B; Fig. 4, a rear end elevation.

The same letters indicate like parts in all the figures.

In the above-mentioned drawings, *a a a* represent the two side or bed pieces and the crosspiece on the front of the harrow.

*b b b*, &c., represent a series of joist or rectangular blocks arranged parallel with each other, so as nearly to fill the space between the two side or bed pieces *a a a*. The blocks *b b b* are not brought close to each other, but are placed a short distance apart, and are made nearly the length of the side or bed pieces *a a*, leaving a space between the crosspiece *a* on the front of the harrow and the ends of the blocks *b b b*.

*c* represents a rod or bar of iron passing through holes made in the front end of the blocks *b b b*, and is fastened to the side or bed pieces *a a*, by which means the rear ends of the blocks *b b b* are left free to rise and fall in order to adapt themselves to the uneven surface of the soil, as will be more fully shown hereinafter.

*d* represents a bar running across the rear end of the blocks *b b b*.

*e e e* represent bolts having large heads. These are made to pass down through holes in the bar *d* large enough to admit of their working easily, and are secured to the blocks *b b b*.

The under side of the side or bed pieces *a a* and of the blocks *b b b* are cut away at their rear end, near where the teeth are secured to the blocks *b b b*, to about one-half of the depth of the wood. This is done for the purpose of allowing the soil as it is turned up by the harrow-teeth to remain light and not to be pressed down by the bed of the harrow, as is done by other harrows.

*f f* represent the harrow-teeth. These are made similar in form to the common cultivator-teeth, with the exception that they are made broader at their rear end, and their front edges, from the point of the tooth to the under side of the blocks *b b b*, are made sharp, like the edge of a plow. They are also provided with slots extending about one-half of the distance from the point of the tooth to where it is secured to the blocks *b b b*.

*g g* represent circular plates of iron or steel, having serrated or saw-tooth edges. These are placed and secured in slots cut through the rear end of the blocks *b b b* and in front of the harrow-teeth *f f* in such a manner as to bring the edge of the plates *g g* within the slots in the harrow-teeth *f f*, the advantages of which are as follows: First, everything tending to dull or injure the edge of the harrow-teeth is warded off from their points, so that the wear is brought always on the side of the harrow-teeth, thereby making the harrow-teeth self-sharpening; secondly, the plates *g g* will mount up onto every substance which may come in their way—such as stalks, sticks, &c.—and either cut them off and press them into the ground, or it immediately lifts the block *b*, and the harrow-tooth *f* passes over the substance, thus making the harrow self-clearing; thirdly, the plates *g g* are made the agents in sowing or distributing the seed, as will be explained hereinafter.

*h* represents a short draft-beam attached to the bar *a*, and is made firm and secure by the braces *i i*.

*j* represents a draft-evener, to which the team is hitched.

*k* represents a foot-board, on which the driver places his feet.

*l* represents an apron attached to the cross-bar *d* on the rear end of the harrow for the purpose of smoothing the furrows made by the harrow-teeth, and for covering such substances as are partially covered and pressed into the ground by the weight of the plates *g g* and blocks *b b b*.

Having described the harrow, I will now proceed to describe the grain-sower and its connections with said harrow.

*m* represents a hopper, in which is placed the grain to be sown. This is made narrow at the bottom and wide at the top, and extends the whole width of the harrow, the center of which is placed a little in front of the space between the cross-bar $a$ on the front of the harrow and the blocks $b\ b\ b$. It is also elevated a little above the harrow, as is seen by the drawings.

$n$ represents an apron extending the entire length of the hopper $m$. It is attached to the bottom of the hopper, on the front edge thereof, and is bent or curved, in the manner shown by the drawings, to the back edge of the cross-bar $a$, for the purpose of spreading and conducting the seed as it falls from the hopper $m$, through the space or aperture before mentioned between the cross-bar $a$ and the blocks $b\ b\ b$, to the ground.

$o\ o\ o$ represent the partitions or divisions into which the hopper $m$ is divided. These linings or partitions are made in an inverted conical or bell-shaped manner, and are provided with holes or openings in the bottoms thereof for the seed to pass through.

$p\ p\ p$ represent a series of slides that move back and forth for the purpose of receiving and discharging the seed, which is done in the following manner: In the center of each slide I make an opening which I call a cup, and in which may be placed thimbles or followers to enlarge or contract the cups for the purpose of varying the quantity of seed required to be sown.

$g\ g\ g$ represent rods with large heads. These are passed through holes made in the front side of the hopper $m$, and are attached to the end of the slides $p\ p\ p$. They are also wound with a spiral spring, $s\ s\ s$.

$t\ t\ t$ represent rods passing through holes made in the back side of the hopper $m$, and attached to the opposite ends of the slides $p\ p\ p$.

$u\ u\ u$ represent rods or levers having arms extending therefrom nearly at right angles. These rods or levers are attached to the blocks $b\ b\ b$, and work on studs or pins a little in the rear of the circular plates $g\ g$.

$v\ v$ represent pins or starts projecting from the side of the circular plates $g\ g$. When the machine is put in motion the plates $g\ g$ are made to revolve, carrying the starts or pins $v\ v$. These act upon the arm of the lever $u$, throwing the upper end of the lever back. This in turn causes the rope or cord $r$ to act upon the slide $p$, bringing the cup under the hole in the hopper $m$. Here it is filled with seed. The arm of the lever $u$ being now disengaged from the starts or pins $v\ v$, the spring $s$ brings the slide $p$ forward, when the cup is emptied of its contents, the seed or grain falling upon the apron $n$, and passing thence through the hole or aperture to the ground.

$w\ w$ represent stands rising from the side or bed pieces $a\ a$, a little in the rear of the hopper $m$. The stands $w\ w$ support a beam or shaft, which in turn supports the lever $x$. The lever $x$ extends from the front of the hopper $m$ to the rear end of the harrow. The rear end of the lever $x$ is connected with the bar $d$ by means of a rod, $y$, the advantages of which are the teeth of the harrow are easier raised above the bed of the harrow for the purpose of clearing them, and in taking the machine to and from the field.

$z\ z\ z$ represent wheels, one of which, with a swivel-bearing, is placed under the draft-beam $h$, and one at each rear end of the side or bed pieces $a\ a$, the object of which is to prevent the side or bed pieces $a\ a$ from dragging on the ground when the machine is not in operation, also to facilitate in the transporting and in the working of the machine. The harrow may be used separate from the grain-sower by disconnecting the cords $i\ i$.

Having described the several parts of my invention and pointed out some of the advantages to be derived therefrom, what I claim as new, and desire to secure by Letters Patent, is—

1. The arrangement and combination of the blocks $b$, circular plates $g$, teeth $f$, levers $u$, and seed-slides $p$, substantially as herein shown and described.

2. The arrangement and combination of the covering apron, $l$, bar $d$, block $b$, rod $y$, and lever $x$, as herein shown and described.

Clinton, January 7, 1859.

JOHN ANDREWS.

Witnesses:
JOSHUA THISSELL, Jr.,
G. YORKE AT LEE.